United States Patent
Falossi et al.

(10) Patent No.: US 11,975,567 B2
(45) Date of Patent: May 7, 2024

(54) HUB BEARING CONSTANT VELOCITY JOINT

(71) Applicant: Aktiebolaget SKF, Gothenburg (SE)

(72) Inventors: Marco Falossi, San Raffaele Cimena (IT); Francesco Lamboglia, Pinerolo (IT); Fabio Marchetti, Brescia (IT); Marco Romanetto, Pianezza (IT)

(73) Assignee: AKTIEBOLAGET SKF (SE)

( * ) Notice: Subject to any disclaimer, the term of this patent is extended or adjusted under 35 U.S.C. 154(b) by 194 days.

(21) Appl. No.: 17/110,203

(22) Filed: Dec. 2, 2020

(65) Prior Publication Data

US 2021/0170788 A1  Jun. 10, 2021

(30) Foreign Application Priority Data

Dec. 6, 2019  (IT) .................. 102019000023208

(51) Int. Cl.
| | |
|---|---|
| *B60B 27/00* | (2006.01) |
| *F16B 21/18* | (2006.01) |
| *F16D 3/224* | (2011.01) |
| *F16D 3/223* | (2011.01) |

(52) U.S. Cl.
CPC ........ *B60B 27/0005* (2013.01); *F16B 21/183* (2013.01); *F16D 3/224* (2013.01); *F16D 2003/2232* (2013.01); *F16D 2003/22326* (2013.01); *Y10S 411/969* (2013.01)

(58) Field of Classification Search
CPC .... B60B 27/0005; F16B 21/183; F16D 3/224; F16D 2003/2232; F16D 2003/22326; Y10S 411/969

USPC ................... 464/178; 384/544, 589; 411/353
See application file for complete search history.

(56) References Cited

U.S. PATENT DOCUMENTS

| | | | | |
|---|---|---|---|---|
| 245,583 | A | * | 8/1881 | Titus ................... B60B 27/0005 384/544 |
| 2,832,390 | A | * | 4/1958 | Kustusch ................ F16B 39/02 411/969 |
| 3,520,222 | A | * | 7/1970 | Placek .................... F16B 31/02 411/353 |
| 6,648,518 | B2 | * | 11/2003 | Uchman ............... F16C 19/186 384/589 |
| 6,739,978 | B2 | | 5/2004 | Hacker et al. |

(Continued)

FOREIGN PATENT DOCUMENTS

| | | |
|---|---|---|
| EP | 2339195 A1 | 6/2011 |
| WO | 2007134157 A2 | 11/2011 |

OTHER PUBLICATIONS

International Search Report for corresponding Italy Patent Application No. 102019000023208 dated Sep. 30, 2020.

*Primary Examiner* — Greg Binda
(74) *Attorney, Agent, or Firm* — Reed Smith LLP

(57) ABSTRACT

A clamping system for a hub bearing assembly includes a screw element configured to engage with a threaded section formed on a flanged hub of a bearing unit. The screw element includes a flange-shaped head configured to cooperate with an annular element of the bearing unit and axially constrain the flanged hub and the annular element, an elastic ring, and at least one annular seat for the elastic ring. The at least one annular seat is formed radially on the inside of the annular element or on the outside of the flange-shaped head along a radially outer peripheral edge of the flange-shaped head.

9 Claims, 4 Drawing Sheets

(56) References Cited

U.S. PATENT DOCUMENTS 7,686,553 B2 * 3/2010 Durfee, Jr. .............. F16B 21/18
                                                           403/353
2003/0064817 A1 4/2003 Hacker et al.

* cited by examiner

US 11,975,567 B2

HUB BEARING CONSTANT VELOCITY JOINT

CROSS REFERENCE OF RELATED APPLICATION

This application is based on and claims priority to Italian Application No. 102019000023208, filed Dec. 6, 2019, under 35 U.S.C. § 119, the entire contents of which are incorporated herein by reference.

TECHNICAL FIELD

The subject matter of this disclosure is related constant velocity joint assemblies, hub bearing units having constant velocity joints, and for vehicles having such hub bearing units.

PRIOR ART

In vehicles that make use of wheel hub bearings a reduction of the weight of vehicle components is a general requirement associated with reduction of emissions and electrification. It is also a way of obtaining a reduction in the costs owing to the smaller amount of material to be used for manufacture. One way of achieving this aim is to redesign interfaces with surrounding components.

In the driving wheels of vehicles, especially front-drive vehicles, the interface between hub bearing unit, known by the abbreviation HBU, and the associated constant velocity joint, known by the abbreviation CVJ, must correctly transfer the torque between the two components as a primary function.

BRIEF DESCRIPTION OF THE DRAWINGS

The invention will now be described with reference to the accompanying drawings which illustrate some non-limiting examples of embodiment thereof, in which.

DETAILED DESCRIPTION

Figure 1:
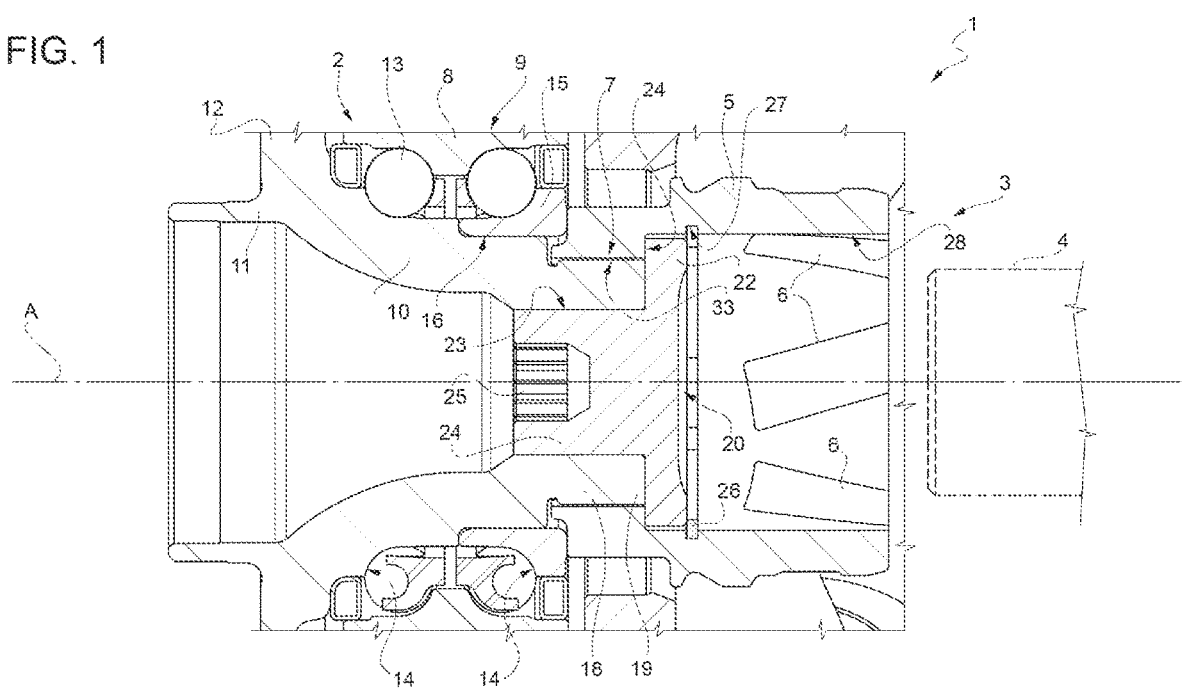
FIG. 1 shows schematically in an orthogonal projection an elevation side view, cross-sectioned along a diametral radial plane, of a hub bearing/constant velocity joint assembly provided in accordance with this disclosure.

In some arrangements a coupling element is used to impart a prestress to rings and associated rolling bodies of an HBU. The forced combination of these components is however not favourably viewed by the market owing to a number of drawbacks. Solutions are divided into two categories: those which transmit only the torque and those which impart and maintain the prestress in an HBU. In the first case an HBU is generally "self-prestressed", for example by means of a cold deformation process. The assembly and the holding together of the two parts is generally performed by means of screw connections, for example using a CVJ having a splined stem which is inserted inside a central hole of a flanged inner ring (also known by the abbreviation "FIR") of a hub bearing and which has a threaded end section onto which a nut is screwed. Said nut may be locked onto a flat region on the outer side of the FIR. Another known solution consists of a CVJ with a shorter stem, or without a stem, but with a threaded hole in its axially central portion. A screw is then introduced on an outer side and used to lock the CVJ against the HBU. In both cases, torque is transmitted by means an axial splined joint at an interface between a stem and a central hole of an FIR or, in a smaller number of cases, by a front splined coupling between a radially outer component or "bell member" of the CVJ or FIR of the HBU.

These solutions however involve the presence of a mechanical component (screw or stem or a combination of the two) which must occupy the entire axial length of the assembly, limiting moreover the length of the splined coupling on the stem.

US2003064817A1 describes a connection between HBU and CVJ in which torque is transmitted using an axial splined coupling between flanged inner ring of a rolling bearing (or hub bearing unit) and bell member of a CVJ, which has an associated central hole; the two parts are clamped together by a screw element which engages with a threading formed radially on the inside of the FIR. A screw element must be positioned inside the hole of the bell member of the CVJ during the operation of assembly of the CVJ itself and must therefore be kept in position until the moment of connection with the HBU, while ensuring correct insertion of the splined coupling, something which is performed using a shoulder formed by an end part of the shaft of the constant velocity joint. A prestress on rings of an HBU is therefore adjusted by means of a clamping force of a screw element which has an actuating seat of the hex key type situated facing on the HBU side and therefore on the outboard side of the vehicle.

This solution involves provisioning a shaft of a constant velocity joint which is particularly long and which has an end facing a screw element having, like a head of a screw element housed inside a bell member of a CVJ, a special shape resulting in additional costs and mechanical machining operations as well as a greater axial volume. There remains moreover in any case a relatively high axial play between the screw element and the shoulder formed by the end of the shaft of the constant velocity joint, which may cause imprecise or difficult positioning of the splined coupling.

Assemblies in accordance with this disclosure incorporate a system for improved coupling and clamping of a constant velocity joint against a hub bearing include a rolling bearing that address the limitations described above.

With reference to FIG. 1, unit 1 denotes in its entirety a hub bearing/constant velocity joint for vehicles, the general structure of which is known.

The assembly 1 comprises a hub bearing unit 2, known in its entirety and illustrated only partly for the sake of simplicity, and a constant velocity joint 3, known as a whole, of which for the sake of simplicity only a shaft 4 and a—preferably bell-shaped—annular joint element 5 are shown, the latter being known as a whole and having, as can be seen in FIG. 1, respective raceways 6 for ball bearings (not shown) of the constant velocity joint 3 which are intended to transmit in a known manner the torque between the joint element 5 and the shaft 4.

The assembly 1 comprises furthermore a clamping system 7 for keeping coupled together, as will be seen, the constant velocity joint 3 and the hub bearing unit 2.

The hub bearing unit comprises a radially outer annular housing or ring 8, defined in the example shown by an outer ring of a rolling bearing 9, a radially inner, annular, flanged hub 10, defined in the example shown by an inner ring of the rolling bearing 9 and provided at a first end 11 thereof with a flange 12 (known and only partly shown), said flange extending radially on the outside of the annular housing 8, and a plurality of rolling bodies 13 arranged between the annular housing 8 and the hub 10 so as to make the hub 10 rotatable with respect to the annular housing 8 about a common axis of symmetry A of the hub 10 and the annular housing 8.

In the non-limiting example shown, the rolling bodies 13 occupy a pair of respective raceways 14, a first one being formed directly on the annular hub 10, on the side where the flange 12 is located, and a second one being formed on a ring (also known as SIR) embedded in a cylindrical annular portion 16 of the hub 10 which is formed on the opposite side to the flange 12 and from which a second end 18 of the annular hub 10, opposite to the end 11, projects axially in cantilever fashion.

Figure 2:
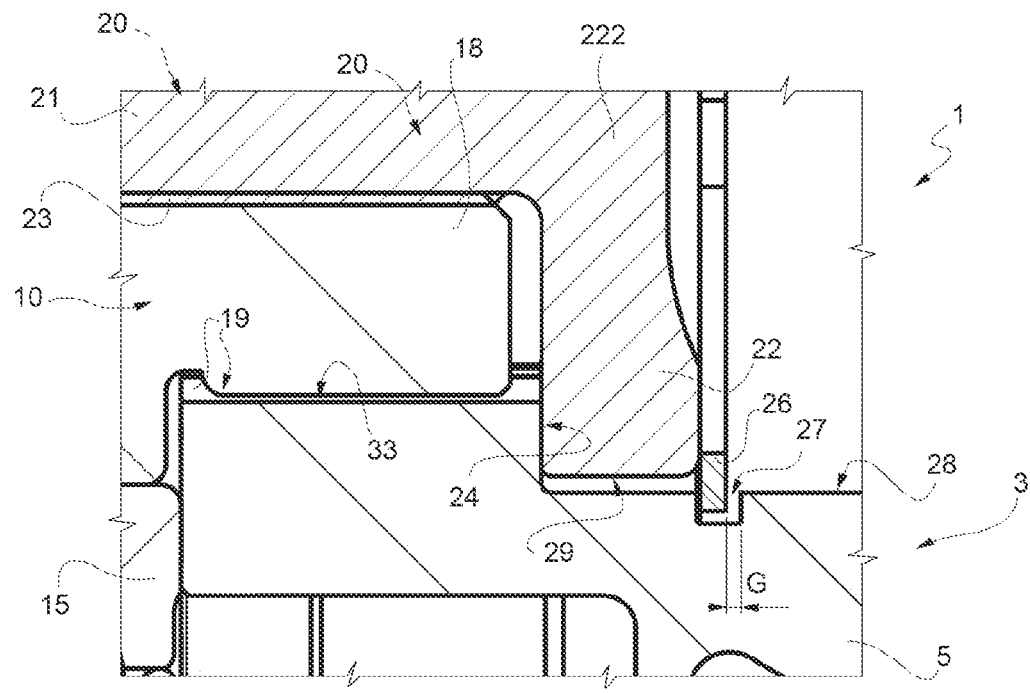
FIGS. 2 to 5 show in schematic view aspects in accordance with this disclosure.

With reference also now to FIG. 2, which shows on a larger scale a detail of FIG. 1, the constant velocity joint 3, as has been seen, comprises the radially outer, annular, joint element 5 which is configured to engage with the second end 18 of the annular hub 10 by means of an axial splined coupling 19 which is known and formed radially on the outside of the annular hub 10.

The clamping system 7 comprises a screw element 20 in turn including a threaded stem 21 and a flange-shaped head 22.

The flange-shaped head 22 extends radially on the outside from a first end 222 of the threaded stem 21 facing, during use, the annular joint element 5.

The clamping system 7 further comprises a threaded section 23 of the annular hub 10, which threaded section 23 is formed radially on the inside of the second end 18 of the hub 10 and is configured to engage with the threaded stem 21 of the screw element 20.

The flange-shaped head 22 is instead configured to cooperate with an annular shoulder 24 of the annular joint element 5 formed inside the joint element 5 on the opposite side to the annular hub 10.

The threaded stem 21 is also provided, on the side facing, during use, the annular hub 10, with an actuating seat 25, of the known type, for example of the hex key type, configured to cause rotation of the screw element 20 by using a tool (known and not shown for the sake of simplicity) on the side where the annular hub 10 is located and through the same.

In accordance with various embodiments, the clamping system further comprises an elastic ring 26 and at least one annular seat 27 for the elastic ring 26 which, in the non-limiting example shown in FIGS. 1 and 2, is formed entirely radially on the inside of the annular joint element 5, in particular on a radially inner, cylindrical, side surface 28 which terminates against the shoulder 24.

In accordance with various embodiments, the at least one annular seat 27 for the elastic ring 26 is configured so that the elastic ring 26, when it is engaged with the annular seat 27, as shown in FIGS. 1 and 2, keeps the flange-shaped head 22 in cooperation with the annular shoulder 24.

In particular, the at least one annular seat 27 is configured so that the elastic ring engages with/inside it with a predefined axial play G which in FIG. 2 is shown enlarged and out-of-scale only for exemplary purposes.

Even more particularly, the at least one annular seat 27 is configured so that the elastic ring 26 engages inside/with it with an axial play G of at least 10 hundredths of a millimetre and which, preferably, is not more than 20 hundredths of a millimetre, i.e. with an axial play G which, remaining within these orders of magnitude, may be defined in the context of the present disclosure as "minimal".

The annular seat 27 is also configured so that the elastic ring 26 engages inside/with it also with a predefined axial play so as to allow in a known manner the operation of the elastic ring 26 which may thus be inserted inside/disengaged from the annular seat 27 as required, by means of a special known tool not shown for the sake of simplicity.

In the embodiment shown in FIGS. 1 and 2, finally, the clamping system 7 includes a single annular seat 27 for the elastic ring 26, which seat 27 is formed radially on the inside of the annular joint element 5, in the proximity of the annular shoulder 24, so that the elastic ring 26, when it is engaged with the single annular seat 27, tightly locks the flange-shaped head 22 between the same elastic ring 26 and the radially inner annular shoulder 24 of the annular joint element 5.

Figure 3:
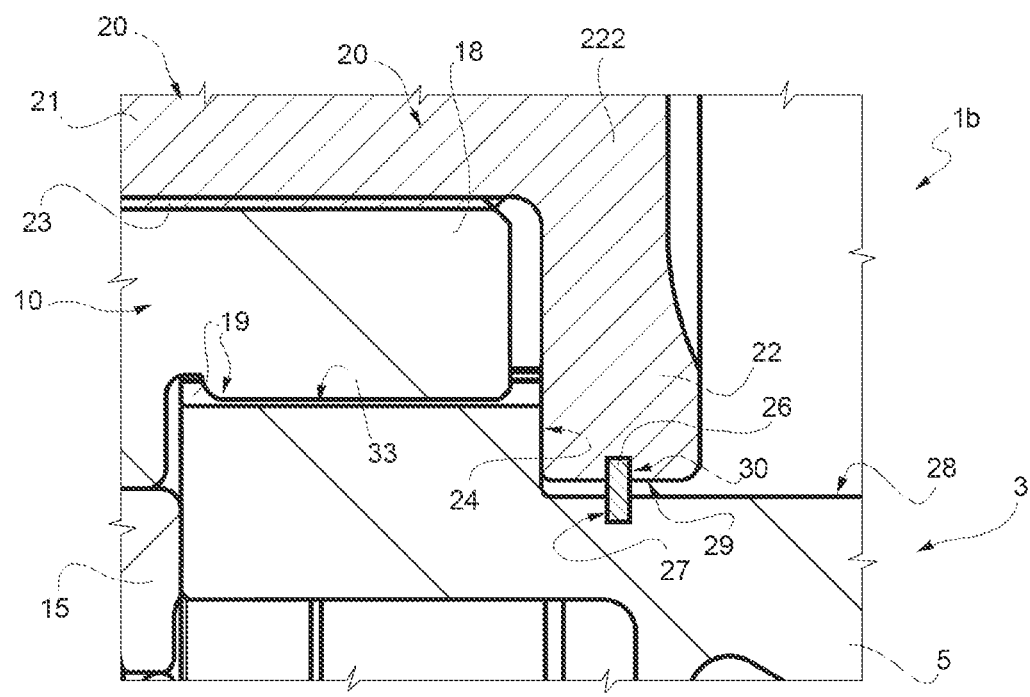
Figure 4:
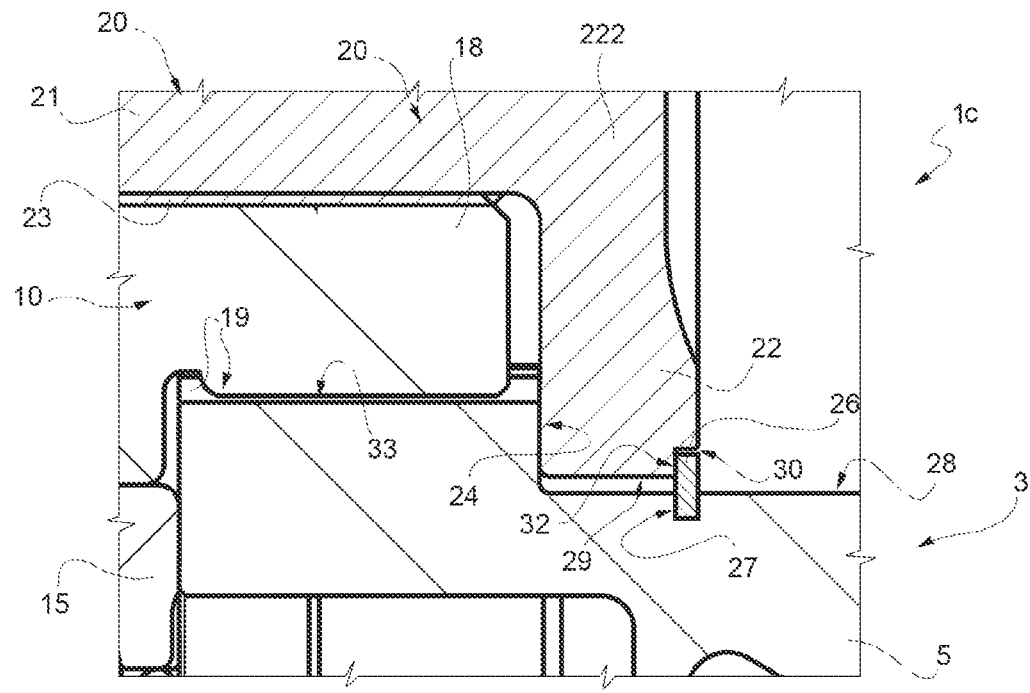
Figure 5:
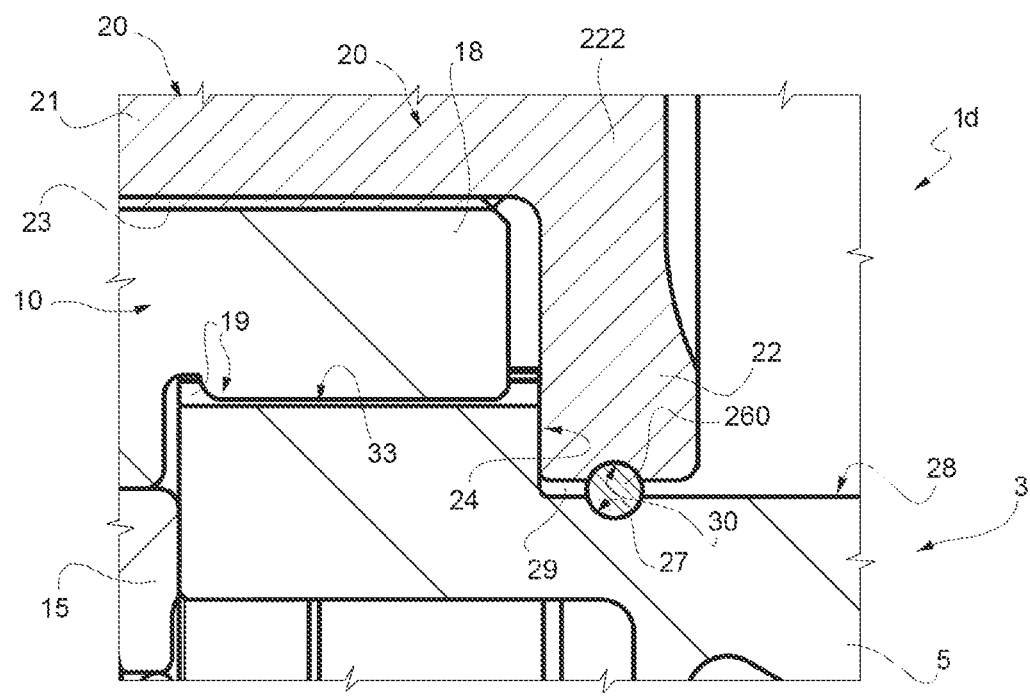

With reference now to FIGS. 3 to 5, where details similar or identical to those already described are indicated for the sake of simplicity with the same numbers, the at least one annular seat 27 for the elastic ring 26, instead of being single and formed only on the joint element 5, may be double, so that the elastic ring 26 engages simultaneously both the joint element 5 and the screw element 20 instead of forming simply a shoulder element for the screw element 20, as shown in FIGS. 1 and 2, where the elastic ring 26 faces the shoulder 24 and is axially spaced therefrom by a distance substantially equal to the thickness, measured in the axial direction, of the flange-shaped head 22.

According to the embodiments shown in FIGS. 3 to 5, therefore, a first annular seat 27 is present, formed radially on the inside of the joint element 5, but a second annular element is also present, formed radially on the outside of the flange-shaped head 22, along a radially outer peripheral edge 29 of the flange-shaped head 22.

In accordance with that shown in FIGS. 3 and 5, where 1b and 1d indicate two alternative embodiments of the assembly 1 shown in FIGS. 1 and 2, the clamping system 7 includes a first annular seat 27 formed on the side surface 28 and a second annular seat 30 for the elastic ring 26.

The seats 27 and 30 are formed facing each other, i.e. the first seat 27 is formed radially on the inside of the annular joint element 5, in the proximity of the annular shoulder 24, and the second seat 30 is formed radially on the outside of the flange-shaped head 22, along the peripheral edge 28; according to these embodiments, the elastic ring 26 is configured to engage simultaneously both of the seats 27 and 30, with its radially outer edge and with its radially inner edge, respectively.

According to the embodiment 1 (FIGS. 1 and 2) and 1b (FIG. 3), the elastic ring 26 has a radial cross-section with a quadrangular shape.

Instead, according to the embodiment 1d, the elastic ring 26 has a radial cross-section with a circular shape, and therefore the elastic ring 26 has a toroidal shape.

In the embodiments 1b, 1d, in order to be able to allow, as will be seen, the assembly of the constant velocity joint 3/hub bearing 2, the radial depth of the annular seat 27 is less than the thickness or radial widthwise extension (i.e. cross-section) of the elastic ring 26, while the radial depth of the annular seat 30 must be greater than the thickness or radial widthwise extension (i.e. cross-section) of the elastic ring 26.

According to the embodiment 1c shown in FIG. 4, finally, the second annular seat 30 for the elastic ring 26 is formed on a front surface 31 of the flange-shaped head 22, said surface 31 being situated facing, during use, on the opposite side to the annular hub 10; the seat 30 extends radially, moreover, as far as the radially outer peripheral edge 29, so as to delimit a step 32 thereon.

In accordance with various embodiments, in all the embodiments 1, 1b, 1c, 1d described, the axial splined coupling 19 is formed radially on the outside of the second end 18 of the annular hub 10, axially offset towards the annular joint element 5 with respect to the threaded section 23 of the annular hub 10 formed radially on the inside of the second end 18 of the annular hub 10.

In this way, in accordance with various embodiments, at last part of the splined coupling 19 protrudes axially in cantilever fashion towards the annular joint element 5 with respect to threaded section 23.

Figure 6:
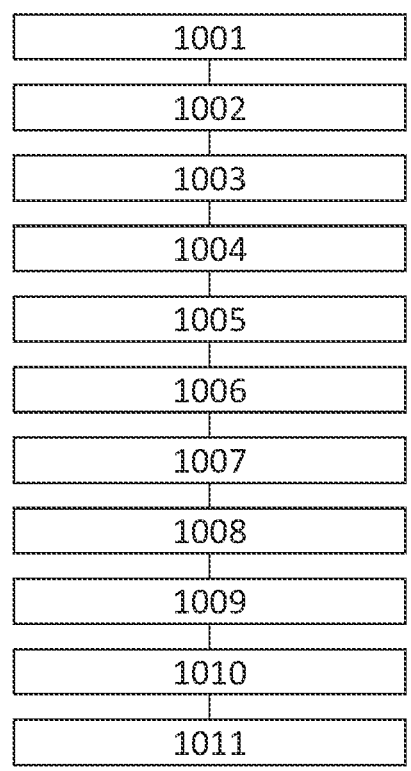
FIG. 6 illustrates a method in accordance with this disclosure.

From that described hitherto, finally, it is clear that the subject matter of this disclosure relates also to a method for manufacturing a hub bearing/constant velocity joint assembly for vehicles such as the assemblies 1, 1b, 1c, 1d described, comprising the steps below illustrated in FIG. 6.

A first step 1001 for providing a hub bearing unit 2 comprising a radially outer annular housing 8, a radially inner annular hub (10) provided, at its first end 11, with a flange 12 that radially extends on the outside of the annular housing 8, and a plurality of rolling bodies 13 arranged between the annular housing 8 and the hub 10 in order to make the hub 10 rotatable with respect to the annular housing 8 about a common axis of symmetry A.

A second step 1002 for providing a constant velocity joint 3 in a disassembled (i.e. dismounted) configuration and comprising a shaft 4, rolling bodies, known and not shown for simpler illustration, and an annular joint element 5 radially on the outside with respect to the shaft 4, configured to engage with a second end 18 of the annular hub 10, opposite to the first end 11, by means of an axial splined coupling 19 formed radially on the outside of the annular hub 10.

A third step 1003 for providing a screw element 20 including a threaded stem 21 and a flange-shaped head 22 that extends radially on the outside from a first end 222 of the threaded stem 21; during this step the threaded stem 21 is provided, on the opposite side to the flange-shaped head 22, with an actuating seat 25 configured for rotation of the screw element 20.

A fourth step 1004 for forming, radially on the inside of the second end 18 of the annular hub 10, a threaded section 23 configured to engage with the threaded stem 21 of the screw element 20.

A fifth step 1005 for forming, on the inside of the annular joint element 5, an annular shoulder 24 configured to cooperate, during use, with the flange-shaped head 22 of the screw element 20 on the opposite side to the annular hub 10.

A sixth step 1006 for inserting, according to a first aspect of the invention, the screw element 20 inside the annular joint element 5 on the side where the threaded stem 21 is located and until the flange-shaped head 22 is brought into abutment against the annular shoulder 24, causing at least part of the threaded stem 21 of the screw element 20 to axially project out of the annular joint element 5, in cantilever fashion, through an axial through-hole 33 of the annular joint element 5 configured to be facing, during use, the annular hub 10 and to cooperate angularly with the splined coupling 19.

A seventh step 1007 for axially locking, according to an aspect of the invention, the screw element 20 in abutment against the annular shoulder 24 with minimum axial play, by means of the insertion inside the annular joint element 5 of an elastic ring 26 which is snap-fitted into at least one annular seat 27 and/or 30 formed beforehand radially on the inside of the annular joint element 5 and/or radially on the outside of the flange-shaped head 22, along a radially outer peripheral edge 29 of the flange-shaped head 22.

An eighth step 1008 for completely assembling, according to a further aspect of the invention, the constant velocity joint 3, for example by inserting the shaft 4 inside the joint element 5 and engaging the raceways 6 and the shaft 4, in a known manner, with suitable rolling bodies, not shown.

A ninth step 1009 for initially mounting, by means of pushing in an axial direction, the annular joint element 5 onto the axial splined coupling 19 of the second end 18 of the annular hub 10, inserting it there above the suitably shaped hole 33, so as to start angular coupling of the constant velocity joint 3 together with the annular hub 10.

A tenth step 1010 in which, using a tool on the side where the annular hub 10 is located and through the same, rotating the screw element 20 so as to progressively screw the threaded stem 21 onto the threaded section 23 of the second end 18 of the annular hub 18, so as to progressively complete the angular coupling together of the constant velocity joint 3 and the annular hub 10 inserting the splined coupling 19 of the latter completely inside the annular joint element 5.

An eleventh 1011 and final step for continuing to apply a rotational torque to the screw element 20 until the flange-shaped head 22 is pushed against the axial annular shoulder 24 with an axial force such as to obtain predefined prestressing of the rolling bodies 13 of the hub bearing unit 2, this being made possible by the fact that the head 22 which pushes against the shoulder 24 presses the joint element 5 against the ring 15.

On the basis of that described above it is evident that the screw element, contrary to the situation in the present state of the art, is kept in position already during assembly and then during transportation and handling of the constant velocity joint 3 by means of the elastic ring 26 which engages inside a groove defined by the annular seat 27 in the inner surface of the bell member of the constant velocity joint 3, defined by the joint element 5, simplifying the assembly and the design of the constant velocity joint 3, the components of which must no longer have special shapes as in the prior art, with a corresponding reduction in costs.

The internal part of the screw element 20 is blind so as to prevent any penetration of water or dirt inside the constant velocity joint and potential loss of grease or vapour.

Moreover, by introducing the stop function due to the elastic ring 26, the screw element 20 may be easily positioned inside the seat of the hub 10 when it is assembled with the constant velocity joint 3 and these parts kept in position during the subsequent operations in the assembly chain. This also ensures a much smaller displacement of the screw element 20 during the combination with the hub bearing unit 2, which is very important during the coupling operation. During this step, in fact, initially engagement of the splined coupling 19 should be obtained in order to ensure correct alignment and rapid engagement of the screw 20 inside the thread 23, reducing the risk of incorrect insertion. This also ensures that any position of the shaft 4 may be taken into account in order to solve any type of problem which may be encountered in the very limited space of the area of the upright forming part of the vehicle suspension (both during initial installation and during post-sales assistance).

The embodiment 1b is also effective during the assembly of the constant velocity joint, provided that the assembly of the elastic ring 26 may be initially performed on the head 22 of the screw element 20 and therefore in an open environment and without any force during positioning. The screw 20 with the assembled ring 26 is then easily pushed inside the joint element 5 until the ring 26 engages inside the groove 27.

An object of the present disclosure is to provide a hub bearing/constant velocity joint assembly for vehicles with a system for improved coupling and clamping of the constant velocity joint together with the hub bearing, which does not have the drawbacks of the prior art and which, in particular is compact, reliable and able to be easily coupled together in a very precise manner.

An object of this disclosure is also to provide a method for manufacturing in a simple and reliable manner a hub bearing/constant velocity joint for vehicles.

On the basis of this disclosure, therefore, a bearing unit/constant velocity joint assembly for vehicles and an associated manufacturing method are described, these having the characteristic features indicated in the attached claims.

All the objects of the invention are therefore achieved.

The invention claimed is:

1. A hub bearing assembly including a constant velocity joint, comprising:
    a hub bearing unit comprising:
        a radially outer annular housing;
        a radially inner, annular, flanged hub; and
            a plurality of rolling bodies arranged between the annular housing and the flanged hub; and
            an annular element of the constant velocity joint configured to engage with the flanged hub by an axial splined coupling arranged between the annular element and the flanged hub; and
    a clamping system comprising:
        a screw element configured to engage with a threaded section formed on the flanged hub,
            wherein the screw element comprises a flange-shaped head configured to cooperate with the annular element and axially constrain the flanged hub and the annular element; and
            an elastic ring; and
            at least one annular seat for the elastic ring
        wherein the at least one annular seat is formed radially on at least one of an inside of the annular element and an outside of the flange-shaped head along a radially outer peripheral edge of the flange-shaped head.

2. The hub bearing assembly of claim 1, wherein:
    a first end of the radially inner annular hub comprises a flange that extends radially on an outside of the annular housing,
    the annular element of the constant velocity joint is configured to engage with a second end of the annular hub, opposite to the first end, by the axial splined coupling,
    the flange-shaped head of the screw element extends radially on the outside from a first end of a threaded stem facing, during use, the annular element of the constant velocity joint,
    the threaded section of the annular hub is formed radially on an inside of the second end of the annular hub and is configured to engage with the threaded stem of the screw element,
    the flange-shaped head is configured to cooperate with an annular shoulder of the annular element of the constant velocity joint formed on the inside of the annular element on an opposite side to the annular hub;
    the threaded stem is provided, on the side where the annular hub is located, with an actuating seat configured to rotate the screw element by using a tool on the side where the annular hub is located and through the annular hub, and
    the at least one annular seat for the elastic ring is configured so that the elastic ring, when the elastic ring is engaged with the at least one annular seat, keeps the flange-shaped head in cooperation with the annular shoulder.

3. The hub bearing assembly of claim 2, wherein the at least one annular seat is configured so that the elastic ring engages with the at least one annular seat with a predefined axial play (G).

4. The hub bearing assembly of claim 3, wherein the axial play (G) is between 10 hundredths of a millimetre and 20 hundredths of a millimetre.

5. The hub bearing assembly of claim 4, wherein the at least one annular seat comprises:
    a single annular seat formed radially on the inside of the annular joint element, in a proximity of the annular shoulder of the annular element,
    wherein the elastic ring, when engaged with the single annular seat, locks the flange-shaped head of the screw element between the elastic ring and the annular shoulder of the annular element.

6. The hub bearing assembly of claim 1, wherein the at least one seat comprises:
    a first annular seat formed radially on a radially inner surface of the annular joint element of the constant velocity joint; and
    a second seat formed along a radially outer peripheral edge of the flange-shaped head of the screw element;
    wherein the elastic ring engages both annular seats.

7. The hub bearing assembly of claim 6, wherein the second annular seat is further formed on an axially outer surface of the flange-shaped head.

8. The hub bearing assembly of claim 6, wherein the axial splined coupling is formed radially on an outside of the second end of the annular hub and axially offset towards the radially outer annular joint element with respect to the threaded section of the annular hub formed radially on the inside of the second end of the annular hub, wherein at least a portion of the splined coupling axially protrudes in cantilever fashion towards the annular joint element with respect to the threaded section.

9. The hub bearing assembly of claim 1, wherein the elastic ring comprises one of a quadrangular and a circular shaped radial cross-section.

* * * * *